(12) United States Patent
Perry (10) Patent No.: US 7,424,522 B2
(45) Date of Patent: Sep. 9, 2008

(54) METHOD OF PROCESSING DATA FROM A SUBMISSION INTERFACE

(75) Inventor: Russell Perry, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 891 days.

(21) Appl. No.: 10/688,943

(22) Filed: Oct. 21, 2003

(65) Prior Publication Data

US 2004/0093417 A1 May 13, 2004

(30) Foreign Application Priority Data

Oct. 31, 2002 (GB) ................................. 0225410.0

(51) Int. Cl.
*G06F 13/00* (2006.01)
(52) U.S. Cl. ...................... 709/219; 709/228; 719/329
(58) Field of Classification Search ................ 709/217, 709/219, 223, 225, 224, 227, 228; 719/328, 719/329; 707/10
See application file for complete search history.

(56) References Cited

U.S. PATENT DOCUMENTS

| 6,996,800 | B2 * | 2/2006 | Lucassen et al. | ............. 717/106 |
| 7,188,183 | B1 * | 3/2007 | Paul et al. | .................... 709/229 |
| 2001/0009016 | A1 * | 7/2001 | Hofmann et al. | ............ 709/219 |
| 2002/0016801 | A1 * | 2/2002 | Reiley et al. | ................. 707/523 |
| 2002/0116354 | A1 * | 8/2002 | Baudu et al. | .................. 706/47 |

FOREIGN PATENT DOCUMENTS

| WO | WO 01/57651 | 8/2001 |
| WO | WO 01/69890 | 9/2001 |
| WO | WO 02/13025 | 2/2002 |

* cited by examiner

*Primary Examiner*—Viet Vu (57) ABSTRACT

A web form is generated by applying a stylesheet to a set of rules which will subsequently be used to transform client selection data submitted via the web form. Transformed client selection data is used to update a record of the client's state for the current session, and the record is identified for updating with the transformed client selection data either using a client identifier returned with the client selection data, or when the selection data is returned via a different client, an identifier for the session record.

27 Claims, 9 Drawing Sheets

```xml
<?xml version="1.0" ?>
<FormBuilder id="FormDescriptor1.xml">
  <!--
  always perform this set of operations
  -->
  <init>
    <ops>
      <op>
        <docId scope="private">STATE</docId>
        <opType>add</opType>
        <xpath>state/{order}</xpath>
      </op>
    </ops>
  </init>
  <!--
  operation associated with Size radio button
  -->
  <control id="Size">
    <caption>
      <TextElement>Big</TextElement>
    </caption>
    <type>radio</type>
    <!--
    if radio button is set to 'on' then isert value big
    -->
    <value on="big" off="small">off</value>
    <ops>
      <op>
        <docId scope="private">STATE</docId>
        <opType>add</opType>
        <xpath>state/order/{size}</xpath>
      </op>
    </ops>
  </control>
  <control id="Flavour">
    <caption>
      <TextElement>Choc</TextElement>
    </caption>
    <type>radio</type>
    <!--
    if radio button is set to 'on' then insert value choc
    -->
    <value on="choc" off="vanilla">off</value>
    <ops>
      <op>
        <docId scope="private">STATE</docId>
        <opType>add</opType>
        <xpath>state/order/{flavour}</xpath>
      </op>
    </ops>
  </control>
  <!--
  the submit button
  -->
  <control id="Submit">
    <caption>
      <TextElement />
    </caption>
    <type>submit</type>
    <value>Submit</value>
  </control>
  <!--
  perform these operations if an exception occurs
  -->
  <exception>
    <ops>
      <op>
        <docId scope="private">STATE</docId>
        <opType>delete</opType>
        <xpath>state/order[position()=last()]</xpath>
      </op>
    </ops>
  </exception>
</FormBuilder>
```

```
SESSION RECORD XSD:1

<state>
    <order>
        <size> Big <size>
        <flavour> Choc </flavour>
    </order>
</state>
```

```
FORM DESCRIPTOR FD1_AckXSD:1

<control id = " ">
    <type> checkbox </type>
    <value> on </value>
    <ops>
        <op>
            <sessRecID scope="private"> SESSION </sessRecID>
            <opType> delete </opType>
            <xpath>state/order [1] </op>
        </op>
    </ops>
    <caption>
            <TextElement>
             Big
            </TextElement>
            <TextElement>
             Choc
            <TextElement>
    <caption>
</control>

<control id= "Submit">
    <caption>
            <TextElement/>
    <caption>
    <type> submit </type>
    <value> delete </value>
</control>
```

```xml
<xsl:stylesheet version="1.0"
    xmlns:xsl="http://www.w3.rg/1999/XSL/Transform">
    <xsl:include href="primitiv Elements.xsl" />
    <xsl:output omit-xml-declaration="yes" />
    <xsl:template match=" |/">
        <xsl:apply-templates />
    </xsl:template>
    <xsl:template match="text()|@*">
        <xsl:value-of select="." />
    </xsl:template>
    <xsl:template match="state">
        <!--
        id must be set after transformation complete
        -->
        <FormBuilder id="">
            <xsl:apply-templates />
            <!--
            the submit button
            -->
            <control id="Submit">
                <caption>
                    <TextElement />
                </caption>
                <type>submit</type>
                <value>Remove</value>
            </control>
        </FormBuilder>
    </xsl:template>
    <!--
    for every order held in the state document, create a form
    control to allow the entry to be removed
    -->
    <xsl:template match="order">
        <!--
        the control id will have to be set after the this
        transform completes
        -->
        <control id="">
            <type>checkbox</type>
            <value>on</value>
            <ops>
                <op>
                    <docId scope="private">STATE</docId>
                    <opType>delete</opType>
                    <xpath>
                        state/order[
                        <xsl:value-of select="position()" />
                        ]
                    </xpath>
                </op>
            </ops>
            <!--
            insert hints
            associated with the control inside the caption
            element
```

Fig. 6A

```
                                               in this
   case, two captions are speciifed staingthe size
   and flavour
                                         of the lolly
      -->
    - <caption>
       - <TextElement>
            <xsl:value-of select="size" />
         </TextElement>
       - <TextElement>
            <xsl:value-of select="flavour" />
         </TextElement>
      </caption>
     </control>
   </xsl:template>
 :/xsl:stylesheet>
```

Fig. 6B

```
<xsl:stylesheet version="1.0"
    xmlns:xsl="http://www.w3.rg/1999/XSL/Transform">
    <xsl:include href="primitiveElements.xsl" />
    <xsl:output omit-xml-declaration="yes" />
  - <xsl:template match=" |/">
       <xsl:apply-templates />
    </xsl:template>
  - <xsl:template match="text()|@*">
       <xsl:value-of select="." />
    </xsl:template>
  - <xsl:template match="FormBuilder">
     - <form method="POST">
        - <!--
           rewtite URL to send form data to including the
           identifier for the form
           -->
        - <xsl:attribute name="action">
             <xsl:value-of select="@url" />
             ?FormID=
             <xsl:value-of select="@id" />
          </xsl:attribute>
        - <!--
           layout the form controls using a table
           -->
        - <table>
             <xsl:apply-templates />
          </table>
       </form>
    </xsl:template>
  - <!--
     for every control add a new row to the table in the
     arrangment :    caption || caption .. || .. || control
     -->
  - <xsl:template match="control">
     - <tr>
        - <!--
           for every child element under the caption create a
           new column in the table
           -->
        - <xsl:for-each select="caption/*">
           - <td>
                <xsl:apply-templates />
             </td>
          </xsl:for-each>
        - <!--
           place the GUI control component into second column
           of the table
           -->
        - <td>
           - <xsl:choose>
              - <xsl:when test="type='t xt'">
                   <input value="{value}" name="{@id}" />
                </xsl:when>
              - <xsl:when test="type='passw rd'">
``` fig. 7A

```xml
            <input type="password" value="{value}"
                name="{@id}" />
        </xsl:when>
        <xsl:when test="type='checkbox'">
            <input type="checkbox" name="{@id}"
                value="{value}" />
        </xsl:when>
        <xsl:when test="type='hidden'">
            <input type="hidden" value="{value}"
                name="{@id}" />
        </xsl:when>
        <xsl:when test="type='submit'">
            <input type="submit" value="{value}"
                name="{@id}" />
        </xsl:when>
      </xsl:choose>
    </td>
  </tr>
</xsl:template>
<!--
  these elements not required in the html view
-->
<xsl:template match="value" />
<xsl:template match="name" />
<xsl:template match="ops" />
<xsl:template match="op" />
<xsl:template match="opType" />
<xsl:template match="xpath" />
<xsl:template match="type" />
</xsl:stylesheet>
```

Fig. 7B

METHOD OF PROCESSING DATA FROM A SUBMISSION INTERFACE

RELATED APPLICATIONS

The present application is based on, and claims priority from, GB Application Number 0225410.0, filed Oct. 31, 2002, the disclosure of which is hereby incorporated by reference herein in its entirety.

The present invention provides a method of processing data from a data submission interface, such as a web form for example, which may be hosted on a variety of different types of device which may be employed by a user.

When a user navigates a web page which serves the purpose, for example of providing a service, it is frequently the case that the user will be required to input data at a data submission interface or "web form". The information will typically be of a specific semantic type requested in the web form, and may simply be a selection of options which are provided in the form. On submission, this information is transmitted back to the service provider, who then uses the information supplied to provide to the user the requested service in accordance with their preferences as specified on the form. Because virtually all websites accessed from a desktop computer include text, and frequently graphical data formatted using machine readable labels known as html tags, the data submitted from such a web form will usually be in a data format which reflects this. However, the providers of such services increasingly wish to be able to arrange their operations in a way which enables data relating to the provision of such web services, including data returned pursuant to a user filling in a web form, to be stored and processed in a manner which is both independent of the nature of client device used to manifest the data, and which can be used to generate new pages in an efficient manner. In this way it is possible to disseminate the content of a web page to a variety of different types of device. To achieve this therefore it is necessary to provide an ability to transform, for example data received from a submission interface into a different data format which provides such device independence. This enables updated information or other modifications to the service provider's web pages to be generated in the device independent data format, before rendering into an appropriate device-specific form useable for example by the host of the web page, e.g. in the case of the desktop computer, html, rather than having to be configured specially for each class of device on which such a page is to be hosted. Additionally, it is very frequently the case that other computing entities which form part of the service provider's commercial operation (e.g. computing entities of both third party suppliers as well as further computing entities within the commercial organization of the service provider) are likely to be affected by the performance of the service. This could be either as a result of a change in the nature of the service provided (e.g. when alterations are made to the submission interface as a result of this change), or alternatively simply as a routine consequence of performance of the service (e.g. where performance of the service consumes resources supplied by to the service provider by a third party, which resources therefore require replenishment at the optimum time).

A first aspect of the present invention provides a method of processing data received from a submission interface and hosted at a client computing entity within a network, which data includes at least an interface identifier, a client identifier and client selection data, the method comprising the steps of:

generating an identifier for a session record of state for the client, the session record identifier being mapped to the client identifier, selecting, on the basis of the interface identifier, a set of rules for transforming the client selection data, and implementing the selected rules to transform the client selection data; and incorporating the transformed client selection data within the session record to which the transformed client selection data relates using at least one of the client identifier and the session record identifier to correlate the transformed client data with the session record.

In one embodiment the interface will include one or more controls, each of which maps to a rule within the set of rules. In a preferred embodiment the interface is generated using the same set of rules which are used to process the client selection data therefrom, by applying a stylesheet to these rules.

In a further preferred embodiment the updated session record is used to generate a further set of rules which may then in turn be used, in conjunction with a further stylesheet to generate a further submission interface. This finds application for example in generating a submission interface which confirms placing of an order, and provides a client with an opportunity to cancel the order in question.

Embodiments of the present invention will now be described by way of example and with reference to the accompanying drawings, in which:

FIG. 3 is a representation of a Form Descriptor for processing client selection data from the submission interface of FIG. 1A;

Figure 1A:
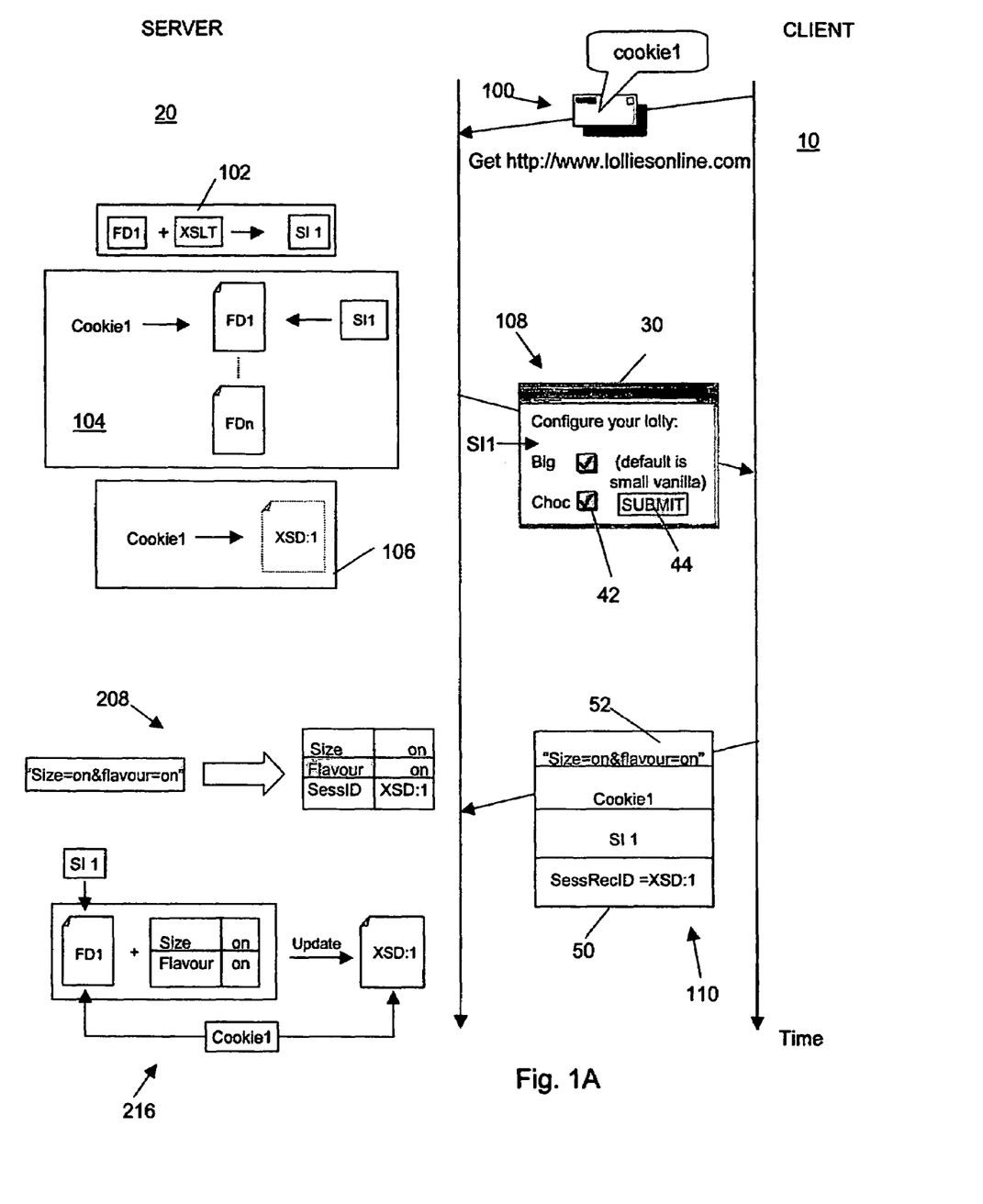
FIGS. 1A and B are schematic illustrations of processes and transactions which take place in an embodiment of method of according to the present invention.
Figure 1B:
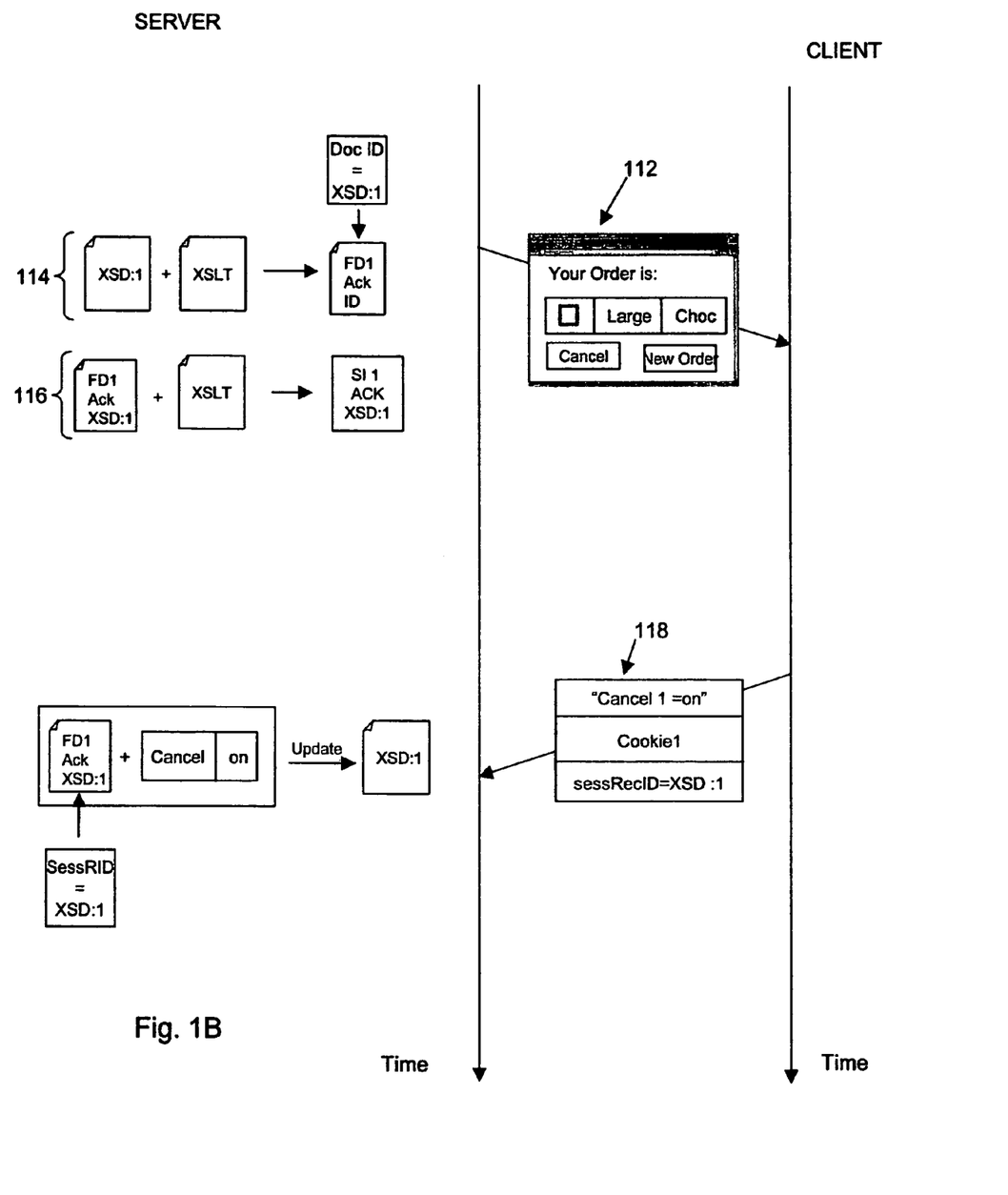

Referring now to FIGS. 1A and B, a scenario in which an embodiment of method according to the present invention finds application involves the purchase of an ice lolly via the Internet is schematically illustrated. These Figures represent a sequence of transactions which occur between a client computing entity 10 and a server computing entity 20, together with operations or processes which occur within the server 20 in relation to those transactions, and will continually be referred to throughout the description of the present embodiments. The scenario is initiated by transaction 100 when the client computing entity 10 contacts the server computing entity 20 via a web browser application programme within the client, for the purpose of downloading a copy of a (fictitious at the time of writing) web page http://www.lolliesonline.com. The process of establishing the connection, i.e. writing and binding of sockets and the various parts of the "handshake" procedure according to http are not illustrated in detail herein. However, one process which does occur and which is illustrated is the receipt by the server 20 of a small text file, known as a cookie, containing data identifying the client; in the present example the client identifier is "Cookie 1". The requested web page 30 is then sent pursuant to the request from the client, and includes a user submission interface SI1 (also known in the art as a Web Form), via which the client may return data to the server. Typically this data will relate to a transaction between a consumer and an enterprise on whose behalf the client and server computing entities are being operated. The submission interface SI1 incorporates user configurable elements known in the art as "controls", which provide a medium for the entering of a consumer's data may be while simultaneously adhering to constraints which the enterprise and/or computational constraints from the client, server or both place on the nature of the data to be entered. In the present example the controls are in the form of checkboxes 42, which have an "on" or "off" state, this being indicated by the presence or absence respectively of a tick in the centre of the box. In the submission interface of FIG. 1A, there is a "default" selection of "small" and "vanilla", and if a user requires either a large ice cream or a chocolate ice cream then they are required to tick on the respective checkbox 42 to indicate such a choice. Once the user is happy with their choice, they click on the SUBMIT button 44, and this causes the web browser programme within the client 10 to transmit a message to the server 20 containing data representing the customer's choice.

Receipt of the client identifier Cookie1 during transaction 100 instigates a series of operations within server 20. The first of these is the creation of a submission interface SI1 at the server from what is known in the present example as a Form Descriptor FD1. A Form Descriptor may be thought of as a skeleton for the format of a submission interface, and which may be used e.g. to create a submission interface, using what is known as a stylesheet (which is in turn a set of rules for transforming device data into device specific form) in a process illustrated in FIG. 1A under the reference numeral 102. Additionally however, a Form Descriptor also provides rules in accordance with which parsed client selection data is processed; Form Descriptors and their operation will be discussed in more detail subsequently within this specification. Following receipt of the client identifier Cookie1 and generation of the submission interface SI1, a number of mappings are then cached in memory at the server. Firstly at process step 102 in FIG. 1A, the client identifier Cookie1 is mapped to each Form Descriptor FD1, . . . FDn used to generate a submission interface which is then sent to the client. Thus far in this example only a single Form Descriptor FD1 has been employed to create a single submission interface SI1, but it is however possible that more than one submission interface (created therefore by more than one Form Descriptor) may be sent to the same client. A further part of the mapping process 104 maps the identifier for the submission interface (here SI1) to the Form Descriptor FD1 by means of which it was created (this apparent duplication finding utility at a later stage in the process). In addition to the above-described mapping processes following receipt of a client identifier such as Cookide1, an identifier for the "session" is generated by process 106 which is initiated by establishment of a connection. A session may be thought of as a series of common, or related transactions. In the present example commonality between two or more transactions is defined as existing when data from the client either maps to, or contains an existing session identifier. A rule governing persistence of a session in the present example provides that a session ends upon the expiry of four hours after its inception by a client. Alternative rules may obviously be employed.

In this example the session identifier is XSD:1, which stands for XML (Extensible Markup Language—i.e. a document formatted using labels conforming to an XML standard) Session Document, i.e. a document in which data for all orders made in the current session is recorded. The identifier XSD:1 is thus, in the present example, an identifier both for the session as a whole, and for the session document (or "session record") XSD:1 in which the session information is to be recorded. The session record XSD:1 is however, at this stage, fictitious in the sense that it has not been created in any material form, as indicated by the dotted lines representing the session record XSD:1 in process 106, but rather is given what may be termed logical existence by the binding of identifier XSD:1 for the fictitious record to the client identifier Cookie 1. In this connection it should be appreciated that the identifier for the session per se is not required and serves no purpose on its own. The idea of a session identifier is employed in the present description to provide a conceptual object to which the identifier for the session record may be attached upon its creation, given that it is created prior to the session record which it subsequently identifies, and the term session identifier will therefore be used in circumstances where, prior to creation of the session record, the identifier for the session record is or may be used. This session identifier is important for the reason that it is independent of client ID (as will subsequently be explained), and is therefore also incorporated into the submission interface SI1.

Figure 2:
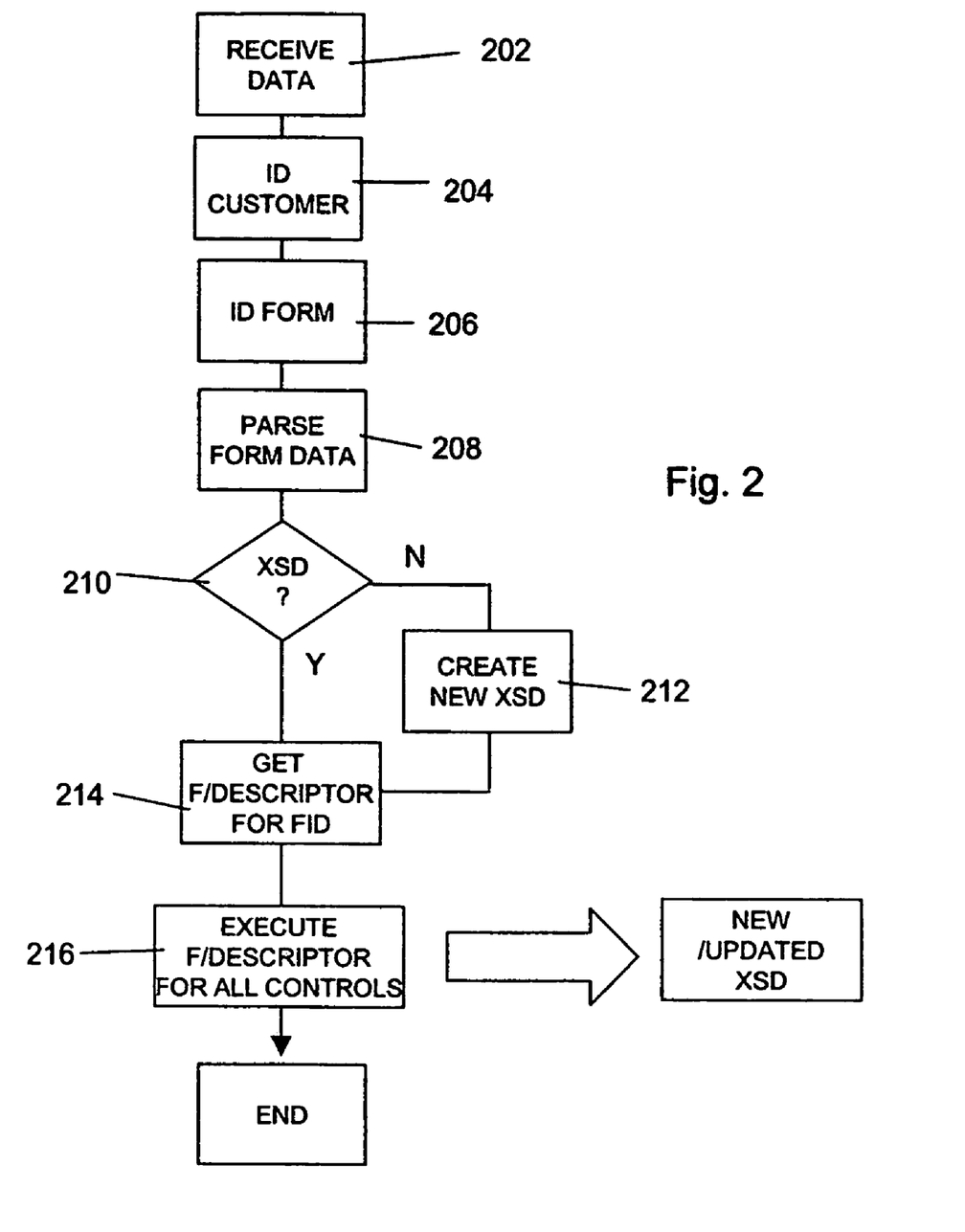
FIG. 2 is a flowchart of the operations taking place at the server in the scenario of FIG. 1.

Following creation of the session record, the requested web page incorporating submission interface SI1 is sent to the client at transaction 108, and having sent the submission interface to the client, the server now starts to execute the routine illustrated in FIG. 2, which relates to the manner in which data from the submission interface is processed at the server, and which will now be described with additional reference to FIG. 2. When the customer hits the submit button 44, a message 50 is sent to the server by the web browser of the client in transaction step 110. This message includes the client identifier Cookie1, the interface identifier SI1 (i.e. an identifier unique within the server to that type of submission interface), the session identifier XSD:1 and the client selection data 52, this being the selection data from the client computing entity which in this instance relates to the nature of the customer's order. In accordance with the routine illustrated in FIG. 2 when the message 50 is received at the server, a routine within the server is initiated at step 202 by receipt of the message 50, following which the identity of the customer is established at step 204, from the cookie, and the identity of the submission interface at step 206 from the interface identifier SI1. At step 208 the data string 52 forming the client selection data from the form is parsed, by which process the meaning of the data from the submission interface SI1, following its transformation into a string of characters, is established. This is illustrated schematically in FIG. 1A, from which it can be seen that it simply involves matching what are known as the value pairs: "Size" and "on", "Flavour" and "on" and "session ID" and "XSD:1" with each other in a manner which is assimilable by the server 20 to enable it to execute the order instructions (i.e. relating to size and flavor of the ice cream). Following the parsing step, the routine establishes at step 210 whether there is an existing session record whose identity maps to the client identifier Cookie 1. As discussed above, in this example, although the session identifier XSD:1 has been created, no document by which such a record may be constituted exists, and so at step 212 a new session record having the form of an XML session document is created with the identity (unique within the server) XSD:1. When a session has been completed, the session record in which the data for that session is stored is then deleted (although the data from it may be stored elsewhere if desired) because the session corresponding to that identifier has come to an end.

Following either directly from step 210, or step 212 via step 210, the routine then proceeds to step 214, at which the submission interface identifier SI1 is used, by means of the mappings put into place upon dispatch thereof, to retrieve the corresponding Form Descriptor FD1. As mentioned previously, the Form Descriptor FD1 maps to both Cookie 1 identifying the client, and also to SI1 identifying the submission interface. The purpose of the use of these two identifiers may be explained as follows. While the appropriate Form Descriptor FD1 for processing the client selection data from the submission interface SI1 may be located entirely on the basis of the interface identifier SI1, without the client identifier Cookie1 it is not possible to map the Form Descriptor FD1 retrieved using the identifier SI1 to the session to which the client selection data which is to be processed in accordance with the rules of Form Descriptor FD1 relates. The mapping of Cookie 1 to the Form Descriptor FD1 may therefore be thought of as serving the purpose of binding or correlating the processing of the client selection data in accordance with the rules of Form Descriptor FD1 with the identity of the document embodying the session record XSD:1, the updating of which is the purpose of the process. At step 216 the rules set out in the Form Descriptor FD1 are then used to process the parsed client selection data. In the present very simple example, the only controls on the submission interface are the two checkboxes 42, and the data returned by the client is consequently very simple.

As mentioned above the Form Descriptor FD1 is essentially a set of rules for transforming the client selection data into data which may be incorporated within a session record, which in this instance has the form of an XML document. In operation the rules in a Form Descriptor are implemented upon the client selection data in order to achieve the transformation by a programme known as an XML form processing engine, generally known per se, which in the majority of circumstances does nothing more than simply execute instructions corresponding to the rules within a Form Descriptor on the client selection data. As will be discussed subsequently however, in the present examples the processing engine additionally comprises what may be thought of as "intrinsic" instructions, i.e. instructions which are not from the Form Descriptor, which are executable on the basis of the content of the Form Descriptor as opposed to the client selection data. The operation of such an engine in implementing the rules in a Form Descriptor will however now be described with reference to the embodiment of Form Descriptor FD1 illustrated in FIG. 3, this being a Form Descriptor which maps to the submission interface SI1 in FIG. 1A. On receiving the parsed client selection information illustrated in FIG. 4, the engine initially processes the first fragment of the Form Descriptor, defined by the XML tag <control id="size">. This tag has the attributes: id="size", and this indicates an instruction to scan the client selection data for the character string "size", and, if that character string is present in the client selection data, then the rules within that fragment (i.e. defined by the <control...>tag) are then applied. Specifically the first sub-fragment, indicated by the reference numeral 302 includes <caption>, <type>, and <value> tags. In combination these represent instructions to insert a value "big" in the session record XSD:1 at the point specified by the value inside the <xpath> tag contained in the following <op> tag if the checkbox value is set to "on". The next tag in this fragment, defined by the <ops> tag prescribes operations which are to be performed on the client selection data in accordance with the rules in the Form Descriptor, which in this instance is located within a further sub-fragment:

```
<op>
    <sessRecID scope="private">SESSION</sessRecID>
    <opType>add</opType>
    <xpath>state/order/{size}</xpath>
</op>
```

The <sessRecID>part of this fragment is concerned with the applicability of the processing operation performed by the processing engine to a more general case than the present example, which will be discussed briefly subsequently herein, and which, where applicable seeks to map or bind the process which is performed in accordance with the rules of the Form Descriptor to the identifier for the session record. The next part of this fragment instructs that what is known as a node or fragment called "order" is to be created within the session record XSD:1, with a sub-fragment called "size"; alternatively if the fragment order already exists in that session record then a sub-fragment "size" should be added to the existing <order> node. Exactly the same process is undertaken for the second <control id="Flavour> fragment, but with, "chocolate" in place of "size". In this way a session record XSD:1 in the form of an XML document containing a fragment of XML in which an order for a big chocolate ice cream is generated. The Form Descriptor FD1 includes two further fragments, the first of which is the <control id="submit"> fragment 306, which finds application only when the Form Descriptor is used for its other purpose, in conjunction with an appropriate stylesheet, viz to generate the submission interface by means of which, in the present example the client selection data has been submitted to the server. The second further fragment is the <exception> fragment 308, which provides instructions for recovery of the pre-existing state in the event that an irregularity occurs.

As mentioned previously, the updated session record XSD:1 acts as a record of the client's state for that session (which, as mentioned above, in the present example is defined as persisting for four hours from the initial connection of the client). At the end of the session the data in the session record can either be recorded in less ephemeral storage (e.g. in the case of an order actually being submitted), or deleted, which may for example occur in the case where no order is actually properly submitted.

Figure 6A:
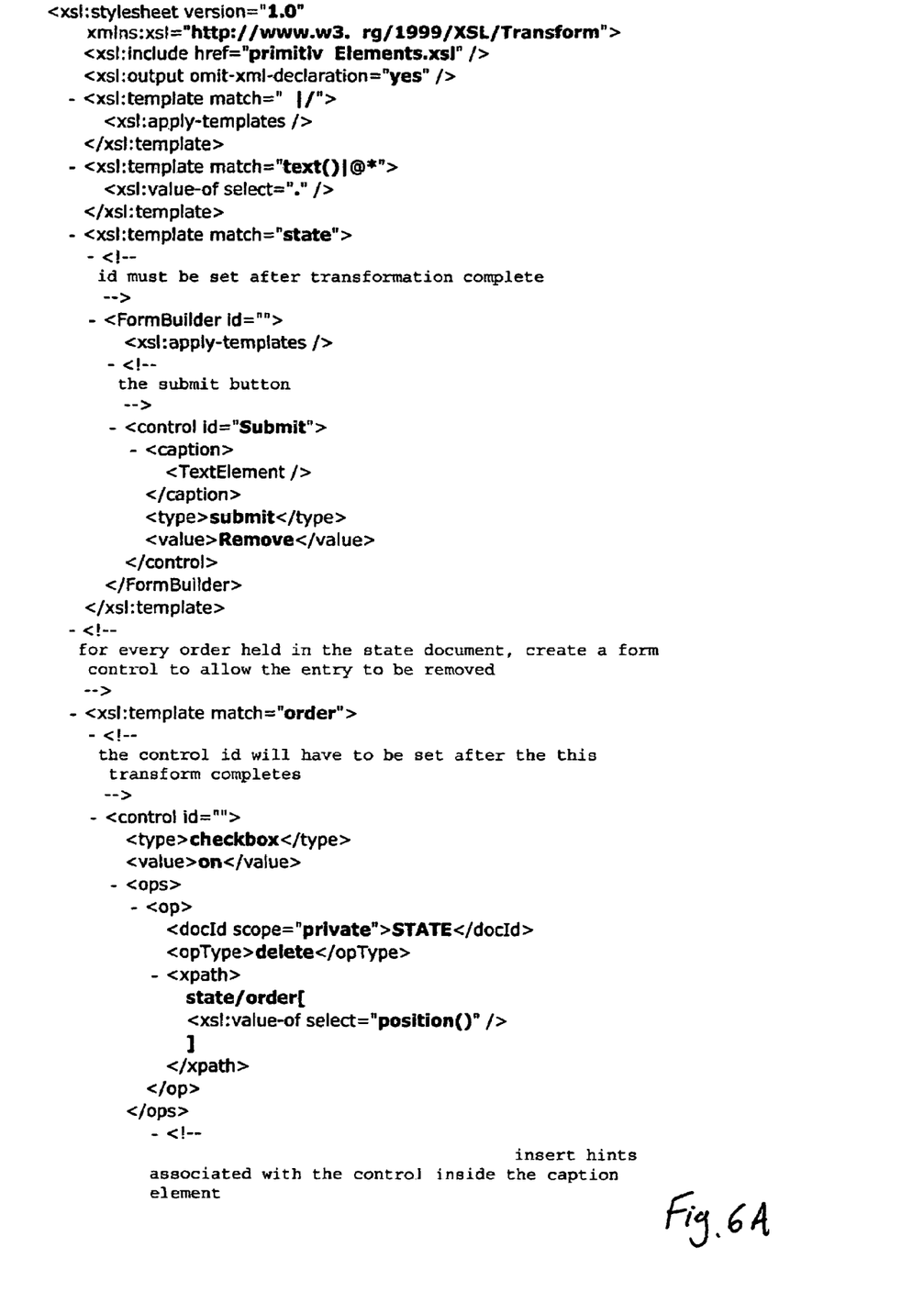
FIGS. 6A and B are a stylesheet used to create the Form Descriptor of FIG. 6.
Figure 6B:
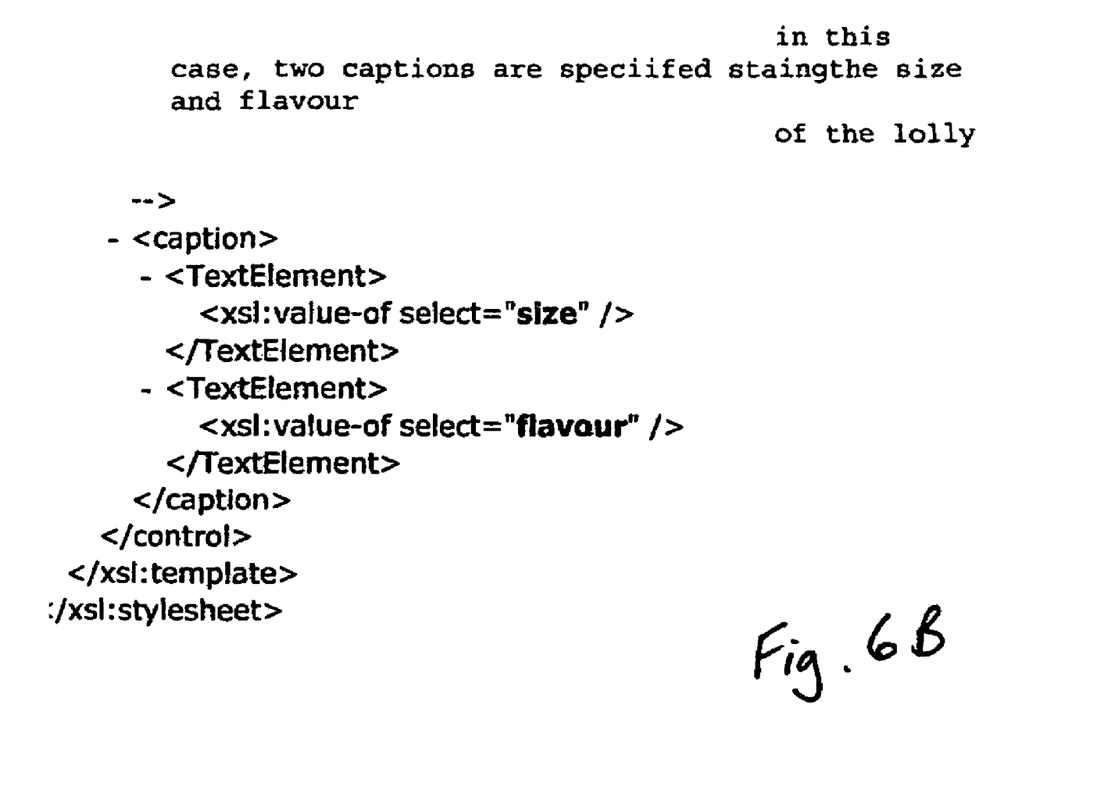
Figure 7A:
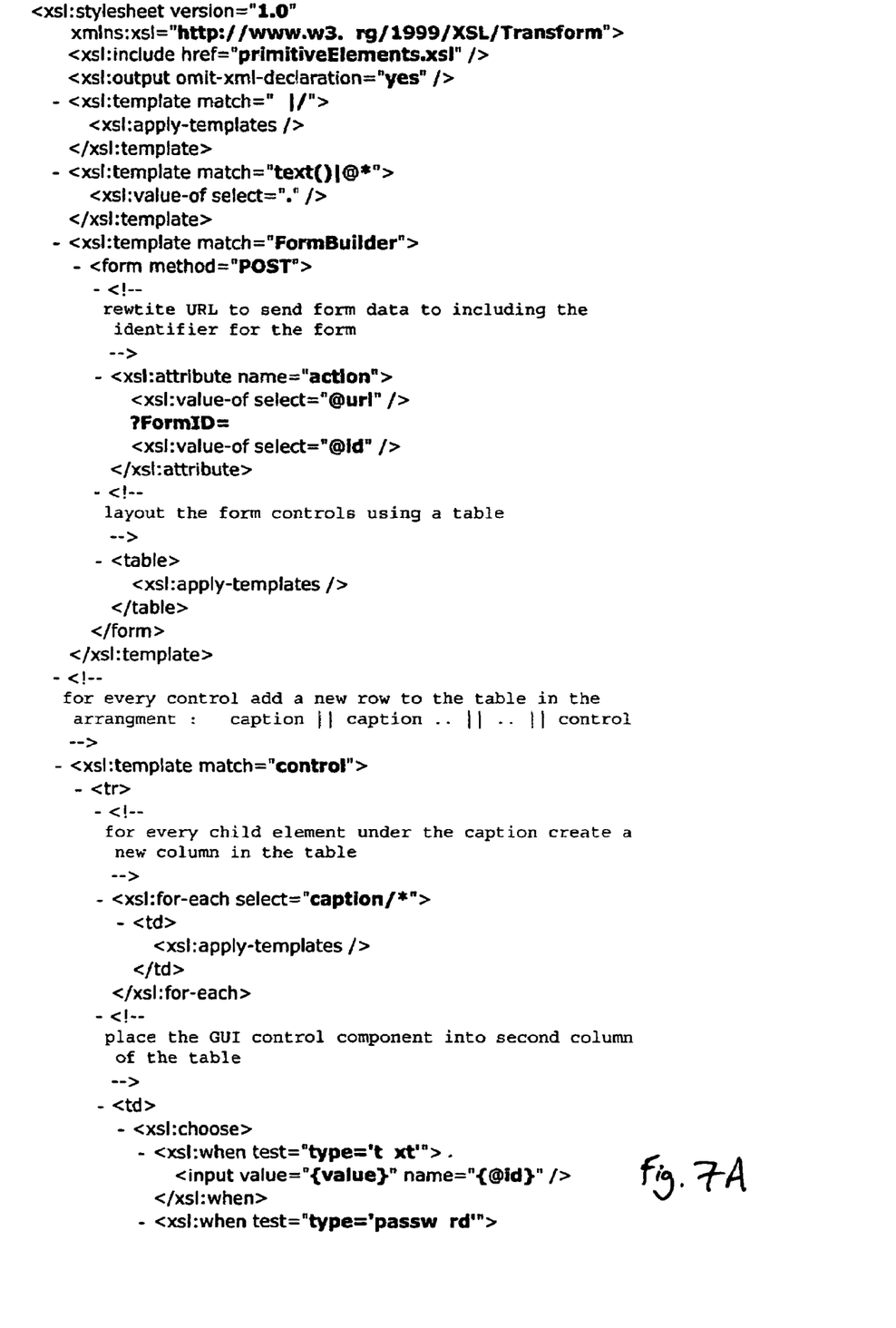
FIGS. 7A and B are a further stylesheet used to create the further submission interface from the Form Descriptor of FIG. 5
Figure 7B:
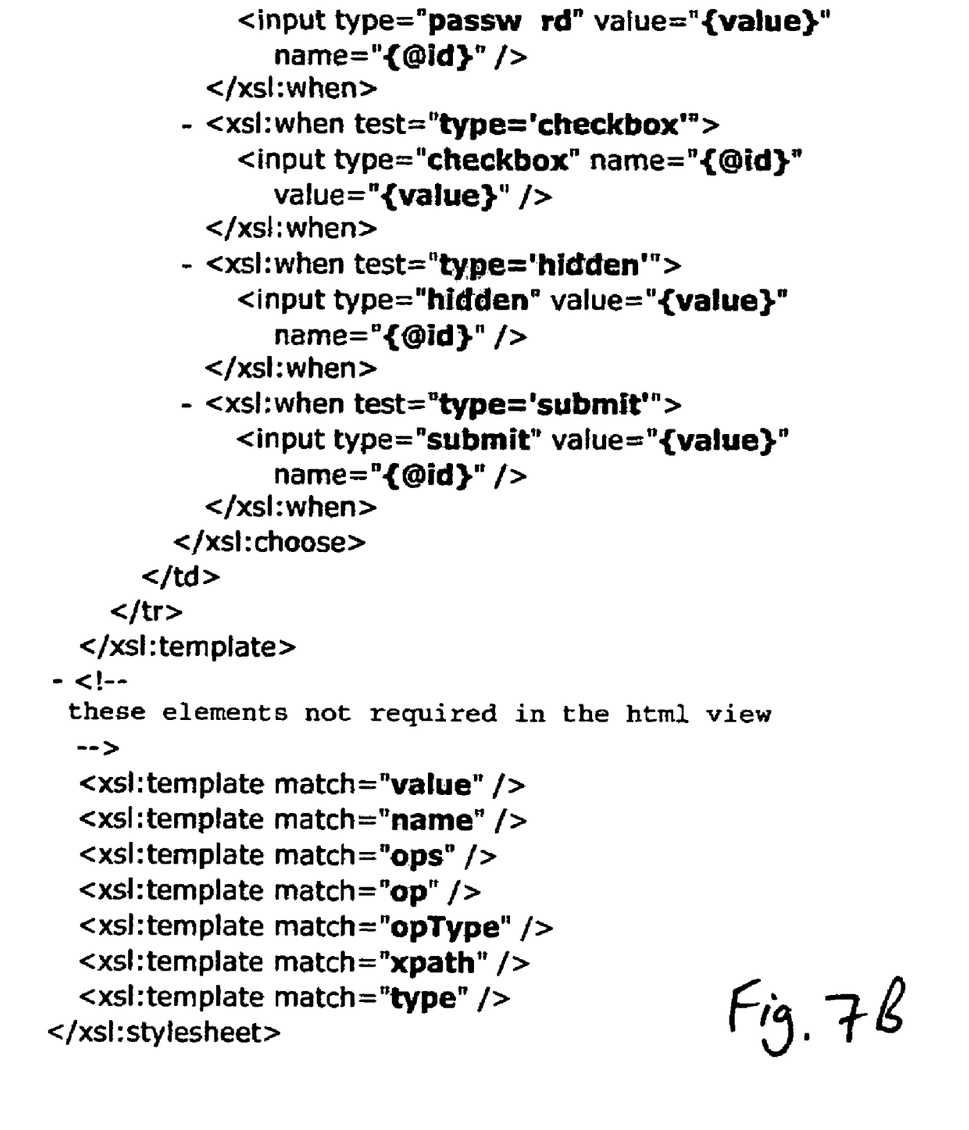

At this juncture (i.e. following submission of the data by the customer and processing of this data at the server side), the customer is preferably now provided with an acknowledgement that the order has been received and is being processed (in a commercial rather than computational sense). Preferably this acknowledgement is provided in the form of a further submission interface enabling the customer to cancel their order or even add a new order as illustrated in FIG. 1B by transaction 112. Generation of such a further submission interface involves a number of steps, represented in FIG. 1B. Firstly, at operation 114, the session record XSD:1 is used in conjunction with a stylesheet XSLT to generate a Form Descriptor $FD_{AckXSD:1}$, which is specific to the submitted order represented in the session record XSD:1, and therefore includes the session record identifier XSD:1. The Form Descriptor $FD_{AckXSD:1}$ is then used at process 116, in conjunction with a further stylesheet XSLT' to create a further submission interface $SI1_{AckXSD:1}$, and it is this which is sent back to the client in the above referenced transaction 112. The stylesheets XSLT and XSLT' by means of which the transformation of the XSD:1 into the Form Descriptor FD Ack XSD:1 and that Form Descriptor to the submission interface SI:$1_{AckXSD:1}$, and illustrated in FIGS. 6 and 7 respectively; stylesheets and their operation are well know per se and will not therefore be discussed further herein.

Figure 5:
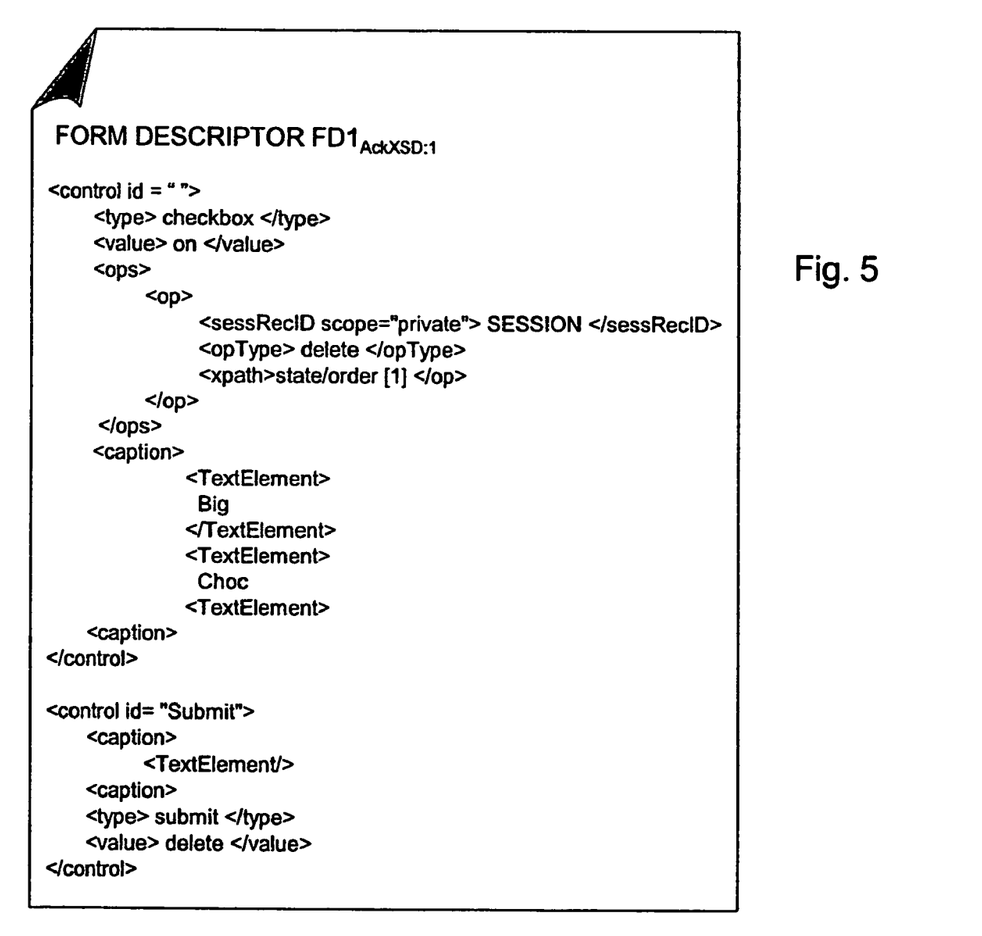
FIG. 5 is a Form Descriptor for processing client selection data from the submission interface of FIG. 1B.

In the event that the client wishes to cancel the order, they simply submit their cancellation instruction using the submission interface SI:$1_{AckXSD:1}$, and the corresponding client selection data is returned to the server at transaction 118 for processing. The manner in which the rules of Form Descriptor $FD_{AckXSD:1}$ are implemented by a processing engine to process the data from the submission interface SI:$1_{AckXSD:1}$ will now be briefly explained with reference to FIG. 5. The tag defining the principal fragment of the Form Descriptor of FIG. 5 has the attribute: id=" ". This indicates that if the client selection data includes an identifier specified within the quotation marks, then the rules within that fragment are to be implemented to process the client selection data. An identifier within the quotation marks here has the purpose of identifying a particular order (in the commercial sense) within the session record XSD:1 to which the client selection data from the submission interface SI$1_{AckXSD:1}$ relates, and this identifier and its relevance will be discussed in more detail subsequently. Within this principal fragment there is then a further conditional rule, defined by the next two tags <type> and <value> and these provide that if the client selection data is from a checkbox, as is the case with the submission interface SI:$1_{AckXSD:1}$, and the value of the checkbox is "on", then the rules within that fragment are to be implemented. The first of these rules is in the tag:

<sessRecID scope="private">SESSION <\sessRecID> and which was mentioned briefly in connection with the description of the processing operation involved in executing the instructions of the Form Descriptor FD1. In essence, and as mentioned above, the purpose of this tag is to provide for a more general case than is shown explicitly in the present example. Specifically, conditional statements within the form processing engine provide that IF:

(1) the keyword "SESSION" is present within this tag of the Form Descriptor, then the processing in accordance with the rules within the Form Descriptor are implemented to update the session record which, indirectly, maps to the Form Descriptor being used;

ELSE (2) a different document is to be sought and amended. A situation in which this might occur is where for example a client logs on some time after the expiry of a session, and wishes to amend an order they have already placed and confirmed. In this instance, the Form Descriptor will create a submission interface identifying a stored document (i.e. not a session record, since the session has expired) on which the order is recorded, and it is upon such a stored document that the client selection data processed by this Form Descriptor is to be incorporated.

Within possibility (1) above, there are two ways in which the Form Descriptor maps to the session record. The first of these is where the client identifier returned with the client selection data from the submission interface SI$1_{AckXSD:1}$ is the same as the client identifier which maps to the Form Descriptor FD$1_{AckXSD:1}$, in which case the client selection data transformed by the Form Descriptor is used to update the session record which maps to the client identifier. The second is where the client identifier returned with the client selection data does not map to the Form Descriptor, in which case the processing engine operates to map to the session record identifier XSD:1.

A situation in which the client identifier does not map to the Form Descriptor FD$1_{AckXSD:1}$ may occur for example in a scenario where the client selection data is submitted by a third party to whom the submission interface SI$1_{AckXSD:1}$ was forwarded by the original client, and who has privileges allowing them to amend, cancel or add an additional order (within the existing session) to the order made by client identified by Cookie1. In this case the client identifier of this third party client would not map to the Form Descriptor FD$1_{AckXSD:1}$, because this Form Descriptor would only map firstly to the submission interface SI$1_{AckSXD:1}$, and secondly to the identifier of the original client, Cookie 1. Where this occurs, and in the absence of a mapping to the session record identifier XSD:1 provided by this rule within the Form Descriptor, there would therefore be no identifier to bind the client selection data processed by the Form Descriptor FD$1_{AckXSD:1}$ to the session record XSD:1, so there would be no way of identifying the session to which it relates, and ultimately therefore it would not be possible to update the session record as a result.

What may be thought of as the "substantive" rules in this fragment are. These rules are contained in the <opType>remove </opType>

Figure 4:
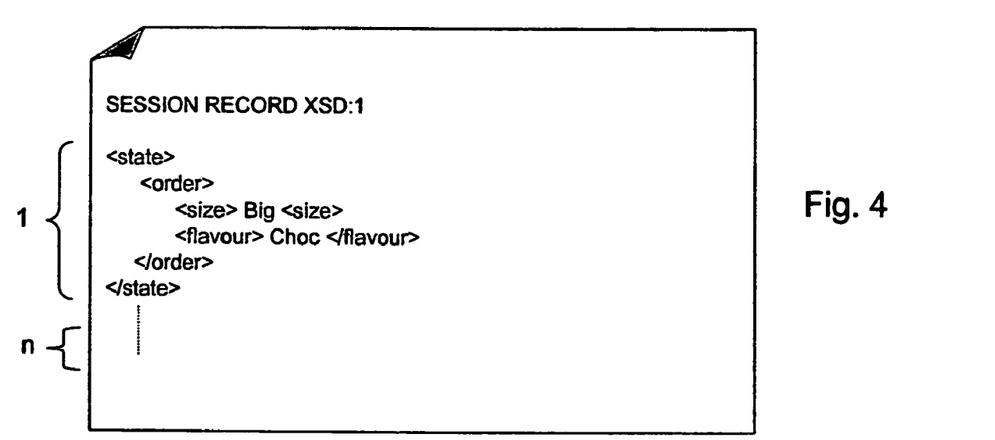
FIG. 4 is a representation of an SML session document created in accordance with an embodiment of method according to the present invention.

<xpath>state/order [1]<\xpath> part of the Form Descriptor, and they indicate that an operation to "remove" the first-placed order (i.e. the temporally the first order of the session, which is spatially first in the illustrated session record XSD:1 and has been thus indicated in FIG. 4. by the ordinal numeral "1") in the session record XSD:1 should be performed, thereby editing the session record XSD:1, and thus cancelling the order.

The use of the ordinal identifier "1" in both the client selection data and the Form Descriptor is neither arbitrary nor coincidental. Firstly, the ordinal identifier in the client selection data cancelling the order must correspond to the ordinal identifier on the session record to which the cancelling instruction relates, otherwise the wrong order within the session would be cancelled; here the "1" indicates that the instruction relates to the first placed order on the session record. Consistency of these ordinal identifiers is achieved by using an incremental counter as each order of a session is entered into the session record, and then carrying these ordinal identifiers through when creating the Form Descriptor from session record. Thus in the present example the ordinal identifier used in:

remove">order [1]

part of the Form Descriptor corresponds to the first order received within the current session, and the receipt of the client selection data to create this order caused the generation of the Form Descriptor in which the identifier appears in the manner shown directly above.

The invention claimed is:

1. A method of processing data received by a server from a submission interface, the processing data originating at a client computing entity within a network, the data including at least an identifier of the submission interface, an identifier of the client computing entity, a client identifier and client selection data, the method being performed at the server and comprising the steps of:

generating an identifier for a session record of state for the transaction session instigated by the client computer entity, mapping the session record identifier to the client identifier;

selecting, on the basis of the interface identifier, a set of rules for transforming the client selection data to a format which is independent of the nature of the client computing entity, and implementing the selected rules so the client selection data are transformed to the format which is independent of the nature of the client computing entity; and incorporating the transformed client selection data within the session record to which the transformed client selection data relate using at least one of the client identifier and the session record identifier so the transformed client data are correlated with the session record.

2. A method according to claim 1 wherein the submission interface includes at least one control which maps to a rule of the aforesaid set of rules.

3. A method according to claim 1 further comprising the step of generating, from the session record, a further submission interface, and sending the further submission interface to the client.

4. A method according to claim 3 further comprising the step of generating, from the session record; a further set of rules for transformation of further client selection data from the further submission interface.

5. A method according to claim 3 further comprising the step of receiving further client selection data from the further submission interface, and further updating the session record following transformation of the further client selection data to the format which is independent of the nature of the client computing entity.

6. A method according to claim 5 wherein a further client identifier accompanying the further client selection data is different from the client identifier accompanying the client original client selection data.

7. A method according to claim 6 wherein the session record identifier is used to correlate the transformed further client selection data with the session record.

8. A method of generating an XML document reflecting the state of the interaction of a client's computer entity with a server; the method being performed by the server and comprising the steps of:

dispatching to the client computer entity a submission interface with at least one control;

mapping an identifier for the submission interface to a set of rules that transforms client selection data generated by the at least one control from the submission interface of the client selection data being transformed to a format which is independent of the nature of the client computer entity;

upon receipt of the client selection data, identifying the set of rules which maps to the submission interface identifier;

applying the identified set of rules so the client selection data are transformed to the format which is independent of the client's computer entity;

recording the transformed client selection data so the aforesaid XML document is generated;

using the document to generate a further submission interface and sending the further submission interface to the client;

transforming further client selection data from the further submission interface using a set of rules used to generate the further submission interface;

and incorporating the transformed further client selection data in the document.

9. A method according to claim 8 further comprising the step of generating an identifier for a session of transactions with the client.

10. A method according to claim 9 wherein generation of the session identifier takes place prior to transformation of the client selection data.

11. A method according to claim 9 further comprising the step of using the session identifier to identity the XML session document.

12. A method according to claim 8 further comprising the step of using a client identifier to map transformed client selection data to the document in order to update the document with the transformed client selection data.

13. A program storage device, readable by a server machine, tangibly embodying a program of instructions executable by the server machine so the server machine can perform a method of processing data received from a submission interface and hosted at a client computing entity within a network, the data including at least an identifier of the interface, an identifier of the client computing entity, and client selection data, the method comprising:

generating an identifier for a session record of state for the client, mapping the session record identifier to the client identifier;

selecting a set of rules for transforming the client selection data on the basis of the interface identifier, the set of rules being capable of transforming the client selection data to a format which is independent of the nature of the client computing entity;

transforming the client selection data to the data format which is independent of the nature of the client computing entity by implementing the selected rules; and correlating the transformed client data to the data format which is independent of the nature of the client computing entity with the session record by incorporating the transformed client selection data within the session record to which the transformed client selection data relates by using at least one of the client identifier and the session record identifier.

14. The program storage device according to claim 13, further comprising mapping to one of the set of rules with at least one control included in the submission interface.

15. The program storage device according to claim 13, the method further comprising generating a further submission interface from the session record, and sending the further submission interface to the client.

16. The program storage device according to claim 15, the method further comprising generating a further set of rules from the session record, the further set of rules for transformation of further client selection data being from the further submission interface.

17. The program storage device according to claim 15, the method further comprising receiving further client selection data from the further submission interface, and further updating the session record following transformation of the further client selection data.

18. The program storage device according to claim 17, wherein a further client identifier accompanying the further client selection data is different from the client identifier accompanying the client original client selection data.

19. The program storage device according to claim 18, further comprising correlating the transformed further client selection data with the session record by using the session record identifier.

20. A program storage device, readable by a server machine, tangibly embodying a program of instructions executable by the server machine so the server machine can perform a method of generating an Extensible Markup Language (XML) document reflecting the state of the interaction of a client's computer entity with the server machine, the method comprising:

sending a submission interface with at least one control to the client;

mapping an identifier for the submission interface to a set of rules for transforming client selection data generated by the at least one control from the submission interface, the set of rules being capable of transforming the client selection data to a format which is independent of the nature of the client computing entity;

identifying the set of rules that maps to the submission interface identifier upon receipt of the client selection data;

applying the identified set of rules so the client selection data are transformed to the data format that is independent of the client computer entity;

generating the XML document in response to the transformed client selection data;

generating a further submission interface using the XML document and sending the further submission interface to the client;

transforming further client selection data from the further submission interface using a set of rules used to generate the further submission interface; and incorporating the transformed further client selection data in the XML document.

21. The program storage device according to claim 20, the method further comprising generating an identifier for a session of transactions with the client.

22. The program storage device according to claim 21, wherein generation of the session identifier occurs prior to transformation of the client selection data.

23. The program storage device according to claim 21, the method further comprising identifying the XML document using the session identifier.

24. The program storage device according to claim 20, the method further comprising updating the XML document with the transformed client selection data by using a client identifier to map transformed client selection data to the document.

25. The method of claim 1 wherein the client identifier and the session record identifier are both used to correlate the transformed client data with the session record.

26. The program storage device of claim 13 wherein the client identifier and the session record identifier are both used to correlate the transformed client data with the session record.

27. A method of communicating an order between a host computer and a server comprising sending a first message with a request for a transaction from the host computer to the server, the first message including an identification of the host computer and client selection data including an indicator of the nature of a purchase a user of the host computer wishes to make and be processed by the server, the server responding to the host computer identification and the client selection data of the first message by generating a session identifier for the transaction and a first submission interface including purchasing choices the user can make and the session identifier for the transaction, the session identifier identifying (a) the session as a whole and (b) the first submission interlace; the server transmitting the first submission interface to the client computer; the user of the client computer responding to the first submission interface by selectively making purchasing choices and transmitting a second message to the server, the second message including (a) the host computer identifier, (b) the session identifier as a whole, (c) the first submission interface identifier and (d) client selection data including the purchasing choice made by the host computer user; the server responding to the second message by forming a second submission interface including (a) an acknowledgement of the purchasing choice, and (b) identifications of (i) the host computer, (ii) the transaction as a whole and (iii) an identification of the second submission interface that differs from the identification of the first submission interface; the server responding to one of the messages by accessing a set of rules for transforming the client selection data into data which can be included in the submission interfaces and that has the form of an XML document; the server transmitting the first and second submission interfaces to the client computer as XML documents.

* * * * *